US011092720B2

(12) United States Patent
Beadie et al.

(10) Patent No.: US 11,092,720 B2
(45) Date of Patent: Aug. 17, 2021

(54) MODULO GRIN OPTICAL DEVICES

(71) Applicant: Peak Nano Optics LLC, Valley View, OH (US)

(72) Inventors: Guy Beadie, Falls Church, VA (US); Richard Lepkowicz, Great Falls, VA (US)

(73) Assignee: Peak Nano Optics LLC, Valley View, OH (US)

( * ) Notice: Subject to any disclaimer, the term of this patent is extended or adjusted under 35 U.S.C. 154(b) by 39 days.

(21) Appl. No.: 16/519,656

(22) Filed: Jul. 23, 2019

(65) Prior Publication Data
US 2021/0026042 A1 Jan. 28, 2021

(51) Int. Cl.
*G02B 3/00* (2006.01)
(52) U.S. Cl.
CPC .................. *G02B 3/0087* (2013.01)
(58) Field of Classification Search
CPC .................................. G02B 3/0087
See application file for complete search history.

(56) References Cited

U.S. PATENT DOCUMENTS

| | | | | |
|---|---|---|---|---|
| 5,847,803 A | * | 12/1998 | Gupta | G02C 7/06 351/159.48 |
| 2002/0076174 A1 | * | 6/2002 | Toyama | G02B 6/4206 385/93 |
| 2003/0044118 A1 | * | 3/2003 | Zhou | G02B 6/1228 385/43 |
| 2009/0269009 A1 | * | 10/2009 | Tanaka | G02B 7/027 385/39 |
| 2010/0149650 A1 | * | 6/2010 | Tanaka | G02B 6/2937 359/664 |
| 2010/0238559 A1 | * | 9/2010 | Tanaka | G02B 6/327 359/664 |
| 2014/0143996 A1 | * | 5/2014 | Bhagavatula | G02B 6/3885 29/428 |
| 2016/0216412 A1 | * | 7/2016 | Kintz | G02B 13/14 |
| 2017/0031098 A1 | * | 2/2017 | Heaton | G02B 6/125 |
| 2017/0075070 A1 | * | 3/2017 | Lohse | G02B 6/12004 |

* cited by examiner

*Primary Examiner* — Omar S Ismail
(74) *Attorney, Agent, or Firm* — Haynes and Boone, LLP

(57) ABSTRACT

The systems, devices, and methods described herein relate to modulo GRIN optical design concepts. The modulo GRIN optical design may include optical devices including may include one or more gradient portions. These optical devices may include an index of refraction with a profile that gradually transitions along an axis of the optical devices with areas of abrupt change. The profile of this index of refraction may provide a shorter focal length than possible using conventional GRIN index of refraction profiles.

18 Claims, 16 Drawing Sheets

MODULO GRIN OPTICAL DEVICES

TECHNICAL FIELD

The present disclosure is directed to a systems, devices, and methods to provide optical devices for light manipulation. More specifically, the present disclosure is directed to modulo GRIN optical devices.

BACKGROUND OF THE DISCLOSURE

Improvements in modern optical devices have led to the use of gradient-index (GRIN) lenses. A GRIN lens is an inhomogenous optical element in which the index of refraction varies over one or more dimensions of the lens. GRIN lenses may be useful because they may include light-refracting properties while having one or more flat surfaces.

However, because GRIN lenses rely on changes in index of refraction to focus light, and the available optical materials for GRIN lenses are somewhat limited, GRIN lenses typically have large focal lengths (sometimes referred to as "weak" lenses). GRIN lenses are also typically used in low-resolution applications because variations in the index of refraction may cause various types of aberration.

Therefore, needs exist for stronger GRIN lenses that use commonly available optical materials, minimize lens thickness, and provide good resolution. The present disclosure addresses one or more of these or other deficiencies in the prior art. In view of all of the above and the figures, one of ordinary skill in the art will readily recognize that the present disclosure introduces a method of forming an optical device, including: forming a first portion having a first end and a second, opposite end, the first portion comprising a first gradient index (GRIN) material, wherein an index of refraction of the first portion varies from a first value at the first end to a second value at the second end of the first portion; forming a second portion adjacent the second end of the first portion, the second portion having a first end and a second, opposite end, the second portion comprising a second GRIN material, wherein an index of refraction of the second portion varies from the first value at the first end to the second value at the second end of the second portion; and removing at least a portion of the first portion or the second portion to form the optical device.

This method may further include removing material from both the first portion and the second portion to form the optical device. The method may include removing material from both the first portion and the second portion to form a flat, non-curved surface of the optical device. In some implementations, the index of refraction of the first portion gradually transitions from the first value at the first end to the second value at the second end of the first portion, wherein the index of refraction of the second portion gradually transitions from the first value at the first end to the second value at the second end of the second portion. In some implementations, the index of refraction of the first portion varies radially from the first value at the first end to the second value at the second end of the first portion with respect to a center point along the first end of the first portion, wherein the index of refraction of the second portion varies radially from the first value at the first end to the second value at the second end of the second portion with respect to a center point along the first end of the second portion.

In some implementations, the index of refraction of the first portion varies spherically from the first value at the first end to the second value at the second end of the first portion with respect to a center point, wherein the index of refraction of the second portion varies spherically from the first value at the first end to the second value at the second end of the second portion with respect to the center point. The method may include forming the first portion from at least a portion of a first spherical shell; and forming the second portion from at least a portion of a second spherical shell.

In some implementations, the first spherical shell has a first radius on an inner surface and a second radius on an outer surface, wherein the second spherical shell has a third radius on an inner surface and a fourth radius on an outer surface. The first radius may be smaller than the third radius. The first value of the index of refraction may be lower than the second value of the index of refraction. The second value of the index of refraction may be lower than the first value of the index of refraction.

An optical device is also provided, which may include: a first portion having a first end and a second, opposite end, the first portion comprising a first gradient index (GRIN) material, wherein an index of refraction of the first portion varies from a first value at the first end to a second value at the second end of the first portion; and a second portion having a first end and a second, opposite end, the second portion comprising a second GRIN material, wherein an index of refraction of the second portion varies from the first value at the first end to the second value at the second end of the second portion, wherein the second end of the first portion is disposed adjacent the first end of the second portion in a manner directing light through both the first and second portions.

In some implementations, the index of refraction of the first portion gradually transitions from the first value at the first end to the second value at the second end of the first portion, wherein the index of refraction of the second portion gradually transitions from the first value at the first end to the second value at the second end of the second portion. The index of refraction of the first portion may vary radially from the first value at the first end to the second value at the second end of the first portion with respect to a center point along the first end of the first portion, the index of refraction of the second portion may vary radially from the first value at the first end to the second value at the second end of the second portion with respect to a center point along the first end of the second portion.

In some implementations, the index of refraction of the first portion varies spherically from the first value at the first end to the second value at the second end of the first portion with respect to a center point, wherein the index of refraction of the second portion varies spherically from the first value at the first end to the second value at the second end of the second portion with respect to the center point. The first portion may be formed from at least a portion of a first spherical shell, wherein the second portion is formed from at least a portion of a second spherical shell. The optical device may have a flat, non-curved surface on at least one side. The first portion and the second portion may be disposed along the flat, non-curved surface. The first value of the index of refraction may be lower than the second value of the index of refraction. The second value of the index of refraction may be lower than the first value of the index of refraction.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
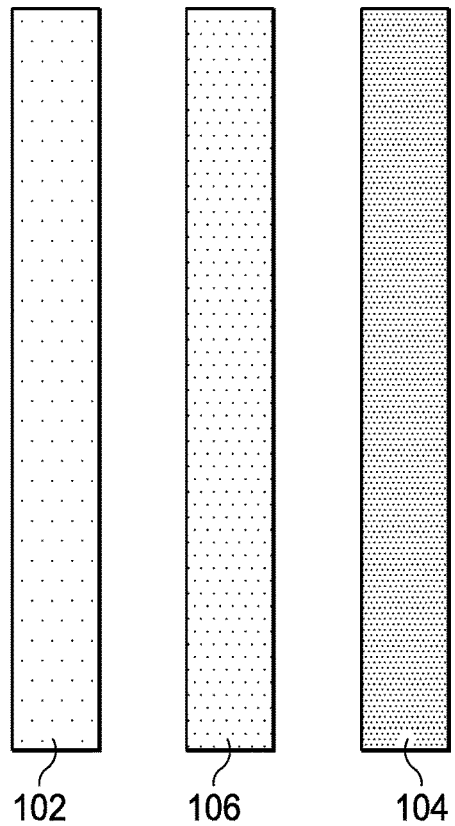
FIG. 1 is a diagram of three portions of optical material according to one or more aspects of the present disclosure.

It is to be understood that the following disclosure provides many different implementations, or examples, for implementing different features of various configurations. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various implementations and/or configurations discussed. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

The systems, devices, and methods described herein relate to gradient index (GRIN) design concepts, and in particular, introduces modulo GRIN as a general approach to gradient index optical design that can use a small refractive index range to mimic the power of an optic fabricated from a much larger index range. Importantly, this concept need not be tied to any specific material system or GRIN lens geometry, but is a general, materials-agnostic method that can be applied to any solution for gradient index optical design. Various implementations of modulo GRIN optical devices, including lenses, are also included. In some implementations, specific GRIN lenses falling within the modulo GRIN design concept include transition portions of two or more optical materials where the index of refraction varies gradually, as well as areas of abrupt change in the index of refraction. In this way, the lens may have a "wrapped" profile of index of refraction that may more strongly focus light as compared to conventional GRIN lenses. This may allow for thinner GRIN optical devices with minimal light losses.

FIG. 1 is a diagram of three portions of optical material according to one or more aspects of the present disclosure. In some implementations, GRIN optical elements may include a first optical material 102, a second optical material 104, and a transition 106 including a mixture of the first and second optical materials 102. GRIN optical elements such as lenses may be formed using optical materials in one or more gradient portions such as the gradient portion 110 shown in FIG. 2A. For example, the gradient portion 110 (which may be part of a GRIN lens) may include a first optical material 102 at a first surface A, a second optical material 104 at a second surface B, and a transition 108 between the first optical material 102 and a second optical material 104. Although three layers are shown FIG. 2A, other embodiments include any number of layers (as shown in FIG. 9F, for example). In some embodiments, modulo GRIN lenses may include hundreds of layers.

As discussed above, modulo GRIN is a general GRIN design concept. Therefore, is applicable to any GRIN lens implementation. Specific GRIN lens materials that could leverage the modulo GRIN concept include optical materials 102, 104 such as ion-exchanged optical glasses, ion-exchanged chalcogenide glasses, nanolayered polymers, co-polymerized polymers, and 3D printed optical inks with position-varying refractive index, as well as other materials.

Figure 2A:
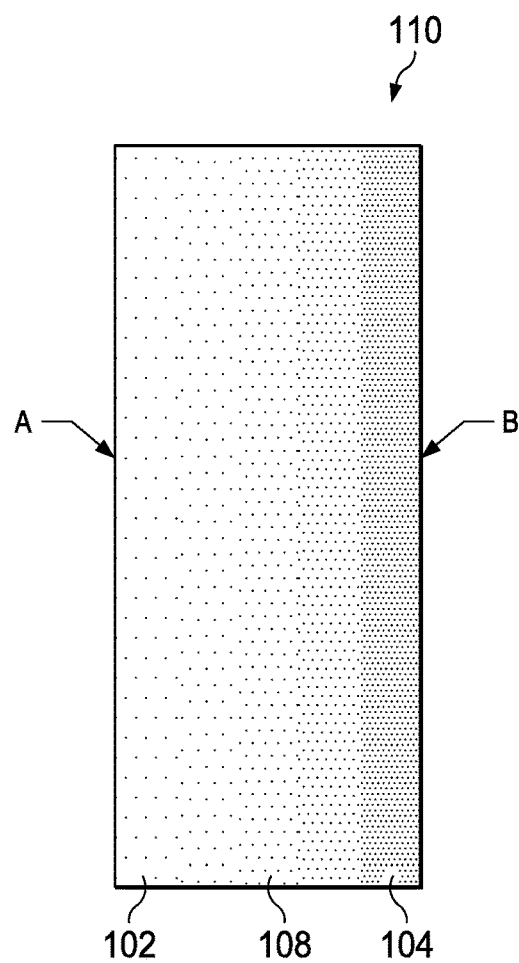
FIG. 2A is a diagram of a portion of optical material including a transition portion according to one or more aspects of the present disclosure.
Figure 2B:
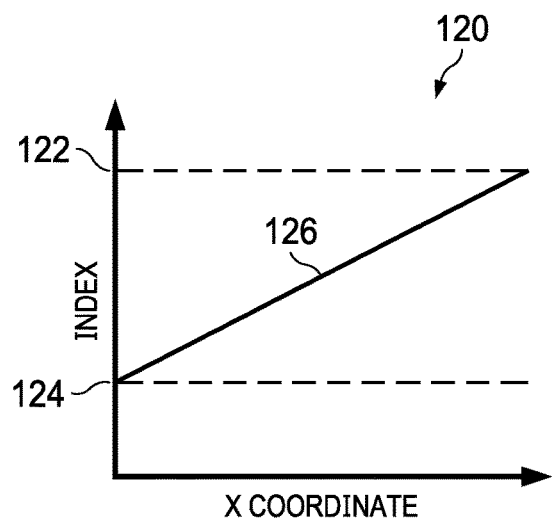
FIG. 2B is a diagram of an index of the portion of optical material in FIG. 2A having a first profile according to one or more aspects of the present disclosure.
Figure 2C:
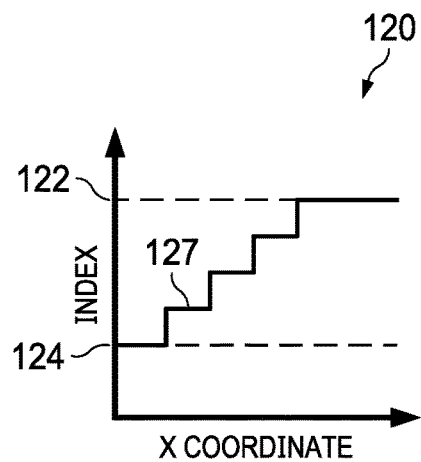
FIG. 2C is a diagram of an index of refraction of the portion of optical material in FIG. 2A having a second profile according to one or more aspects of the present disclosure.

GRIN lenses may include flat or nearly flat surfaces and may minimize aberrations present in spherical lenses. FIG. 2B shows a graph 120 of the index of refraction along the x-coordinate of the gradient portion 110 of FIG. 2A. The first optical material 102 may have a first value 124 of index of refraction and the second optical material 104 may have a second value 122 of index of refraction (higher than the first index of refraction in this example). The profile 126 of the index of refraction changes gradually over the x-axis of the transition portion 110, changing from the lower value 124 of index of refraction at surface A to the higher value 122 of index of refraction at surface B. In some implementations, the profile 126 of the index of refraction includes a smooth transition including one or more linear, logarithmic, exponential, or other curved shapes. In other implementations, the profile 126 of index of refraction exhibits one or more discrete changes in optical materials 102, 104, such that the profile 126 changes abruptly. For example, the GRIN lens may include various discrete segments of different optical materials that are arranged so that the index of refraction has a stepped profile 127 as shown in the example of FIG. 2C.

GRIN lenses may include various types of materials, such as continuously variable (diffused) materials systems and three-dimensional printed geometries. In some implementations, GRIN lenses include transitions between various optical materials. For example, transitions may include ion-diffused areas in optical materials (such as starting or restarting an ion-diffusion process) as well as layers within the material. In the case that the transitions of GRIN lenses comprise layers of various materials, the layers may include linear gradients (as shown in FIG. 2A), radial gradients (as shown in FIG. 3A), spherical gradients (as shown in FIG. 4), or in the most general case can be described as "freeform" GRIN lenses wherein the shapes of the index contours are found via analytic solutions of complicated equations (such as transformational optics methods), or via unconstrained numerical optimization.

Figure 3C:
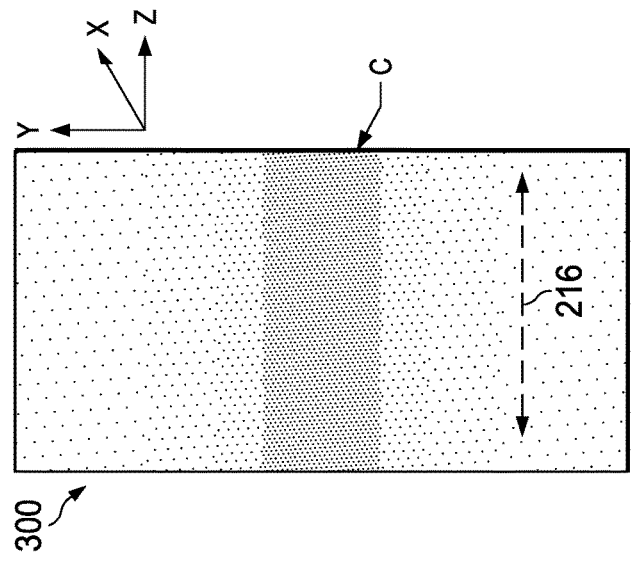
FIG. 3C is a front view of a portion of optical material including a transition portion according to one or more aspects of the present disclosure.
Figure 3A:
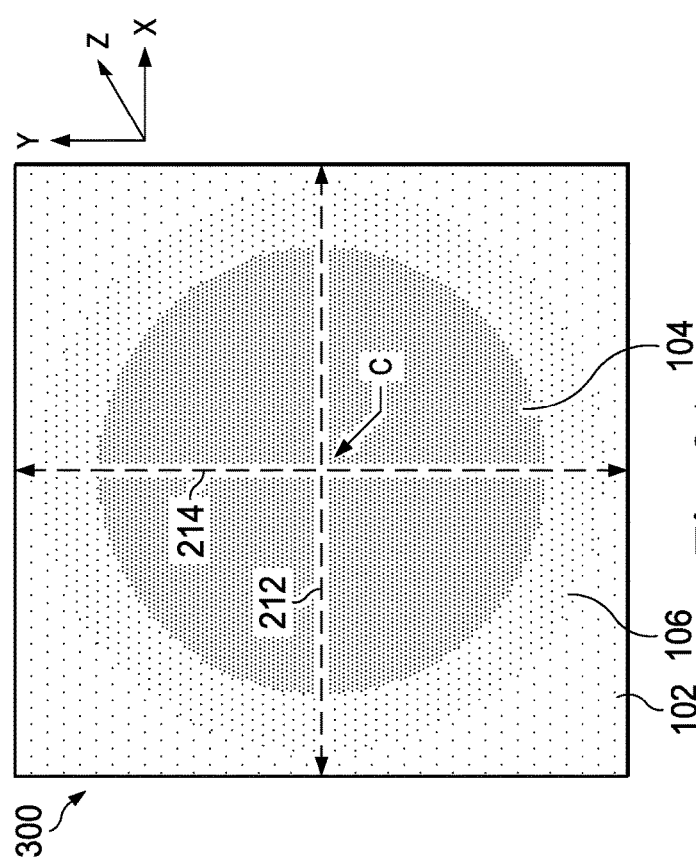
FIG. 3A is a side view of a portion of optical material including a transition portion according to one or more aspects of the present disclosure.
Figure 3B:
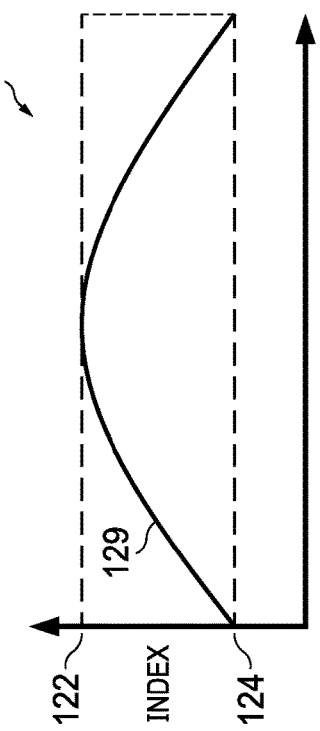
FIG. 3B is a diagram of an index of refraction of the portion of optical material in FIG. 3A according to one or more aspects of the present disclosure.

FIGS. 3A-3C show aspects of radial gradients in optical material. These optical materials may be part of optical lenses. A portion of optical material 300 may include a radial transition from a first optical material 102 to a second optical material 104. FIG. 3A shows a front view of the portion of optical material 300 and FIG. 3C shows a side view of the portion of optical material 300. FIG. 3B shows the index of refraction of the portion of optical material 300 along line 212 (the x-coordinate).

In some implementations, the portion of optical material 300 has a first material 102 with a first index of refraction around the edge of the portion of optical material 300 and a second material 104 with a second index of refraction at a center point C. In some implementations, the index of refraction varies constantly along radii extending out from the center point C. For example, the index of refraction of the portion of optical material 300 varies along a profile 129 between and the first value 124 of index of refraction at the edge and the second value 122 of index of refraction at the center point C, as shown in FIG. 3B. In some implementations, the profile of the gradient along any two radii in the x- and y-axes are the same, while there is no change in the profile of the gradient along the z-axis. For example, the index of refraction may have the same profile along lines 212 and 214 in FIG. 3A (along the x-y plane), while there is no change in index of refraction along line 216 (along the z-axis) in FIG. 3C.

Figure 4:
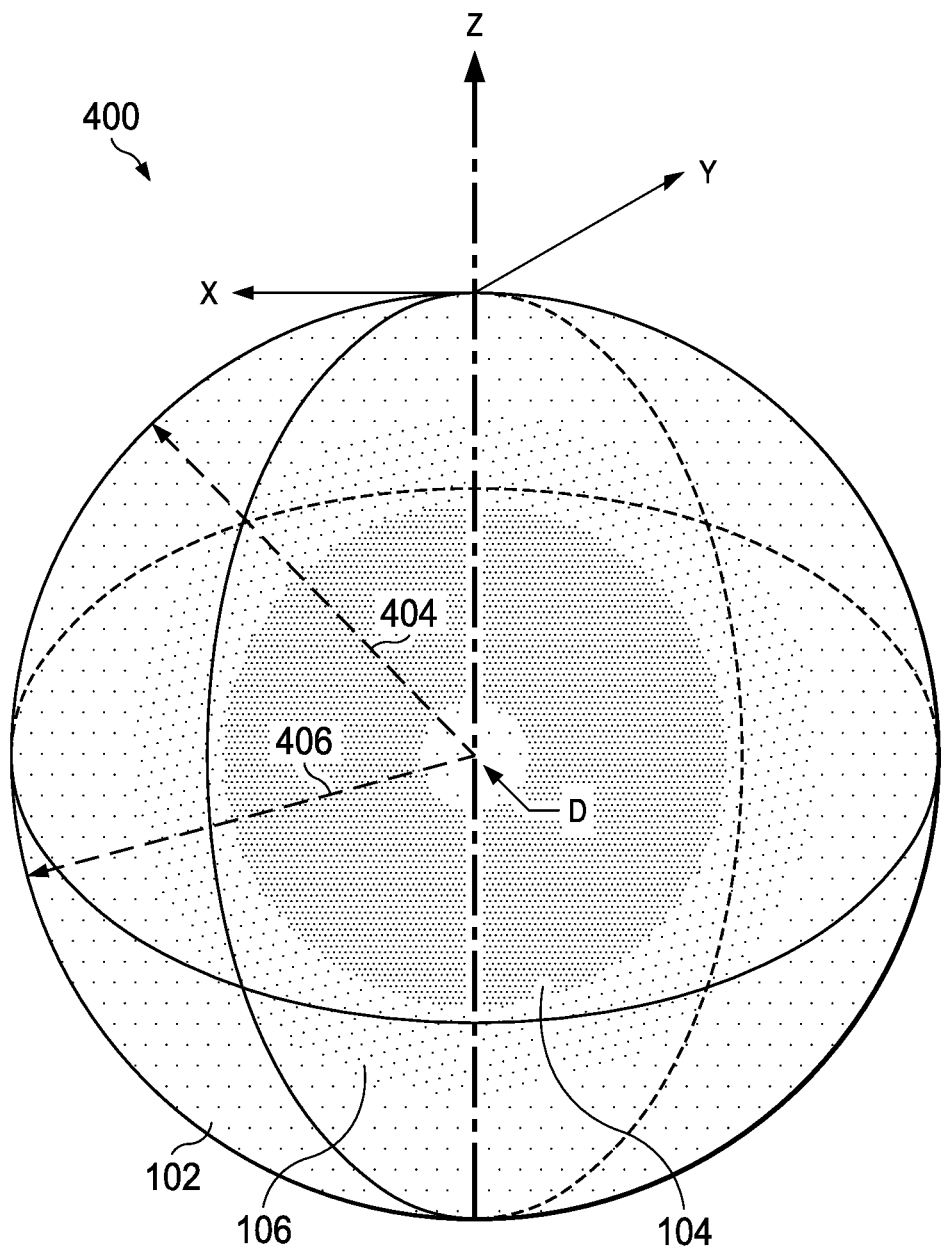
FIG. 4 is a diagram of a spherical portion of optical material according to one or more aspects of the present disclosure.

FIG. 4 show aspects of spherical gradients in optical material. A portion of optical material 400 may include a radial transition from a first optical material 102 to a second optical material 104 in every direction. For example, the profile of the index of refraction of the portion of optical material varies along line 404 and line 406. In some implementations, the profile of the index of refraction along line 404 is the same as the change in index of refraction along 406.

Figure 5A:
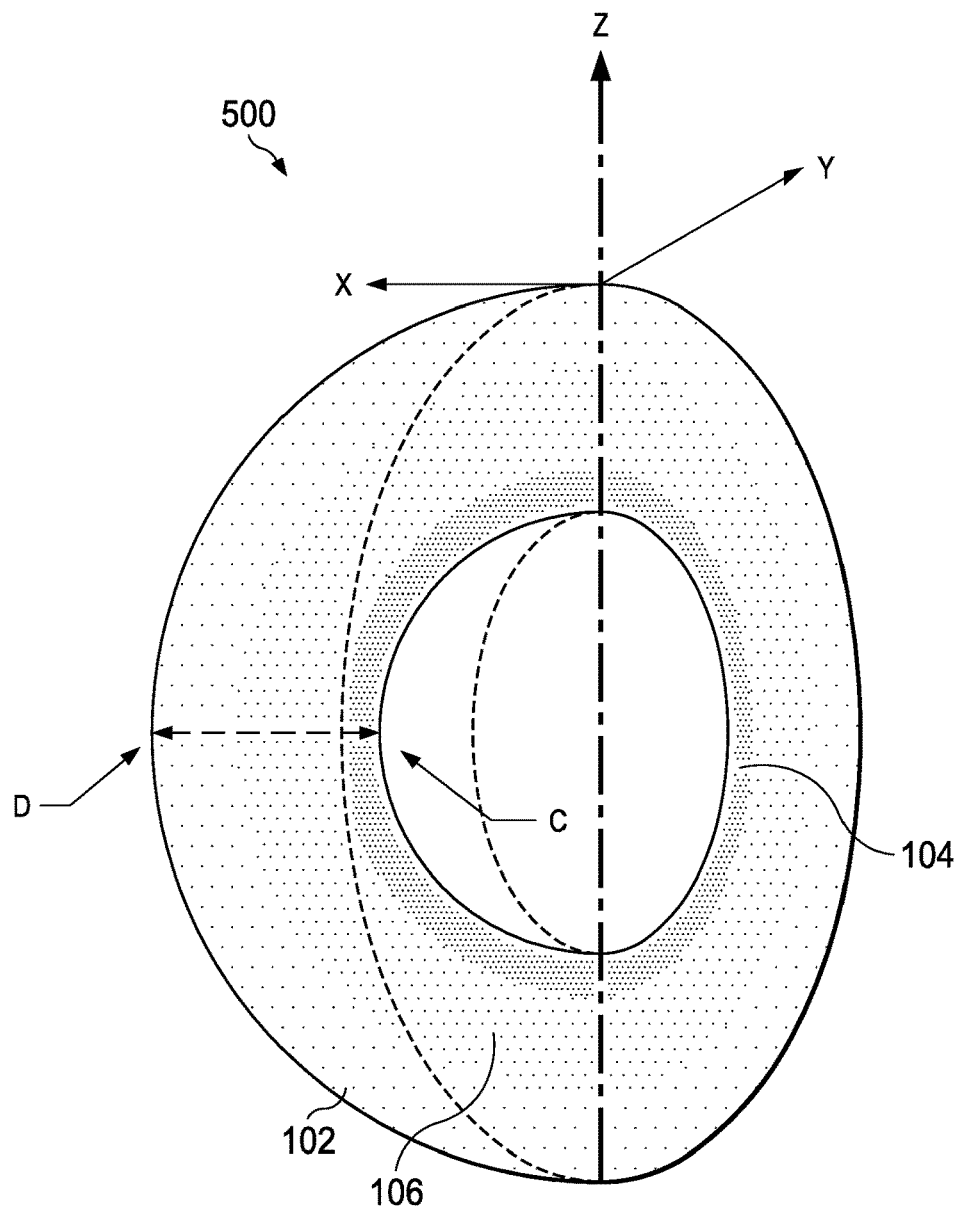
FIG. 5A is a perspective view of a spherical portion of optical material including a transition portion according to one or more aspects of the present disclosure.
Figure 5B:
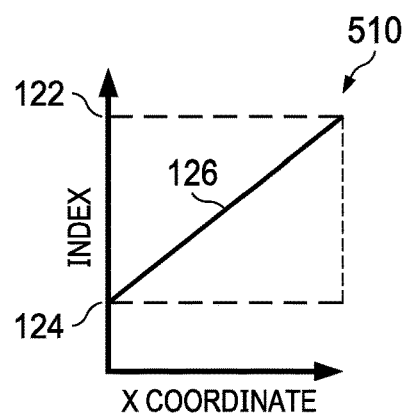
FIG. 5B is a diagram of an index of refraction of the spherical portion of optical material in FIG. 5A according to one or more aspects of the present disclosure.
Figure 5C:
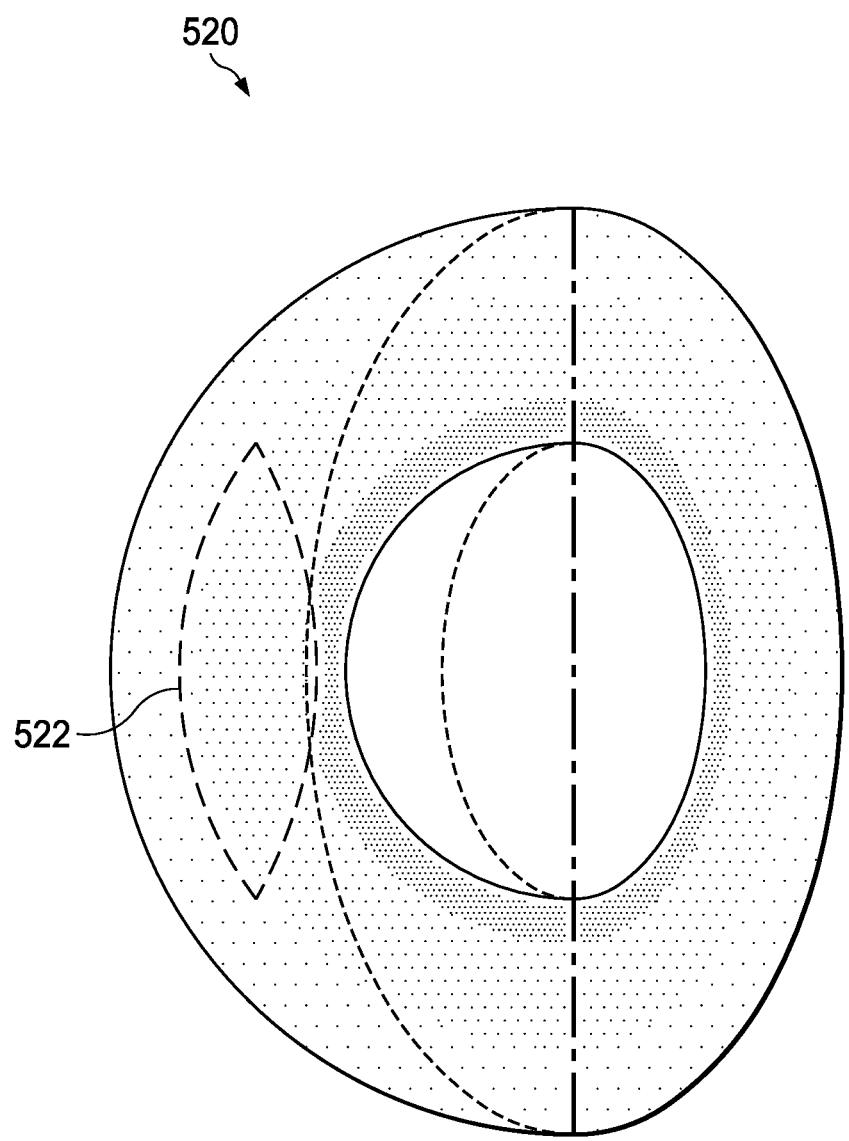
FIG. 5C is a perspective view of a spherical portion of optical material including a lens according to one or more aspects of the present disclosure.

FIG. 5A is a side view of a spherical portion 500 of optical material including a gradient portion 500 according to one or more aspects of the present disclosure. In some implementations, the portion 500 of optical material includes a first material 102 and a second material 104 disposed in a linear, radial, or spherical gradient in the portion 500 of optical material. An index of refraction for the spherical portion 500 varies from a first value 124 to a second value 122, as shown in graph 510 of FIG. 5B. In some implementations, the spherical portion 500 of optical material is formed from a linear gradient portion 110 (as shown in FIG. 2A) that has been formed in to a spherical shape. In some cases, after forming the spherical portion 500, a GRIN lens 522 may be created by removing material from the spherical portion 520, as shown in FIG. 5C.

Figure 6A:
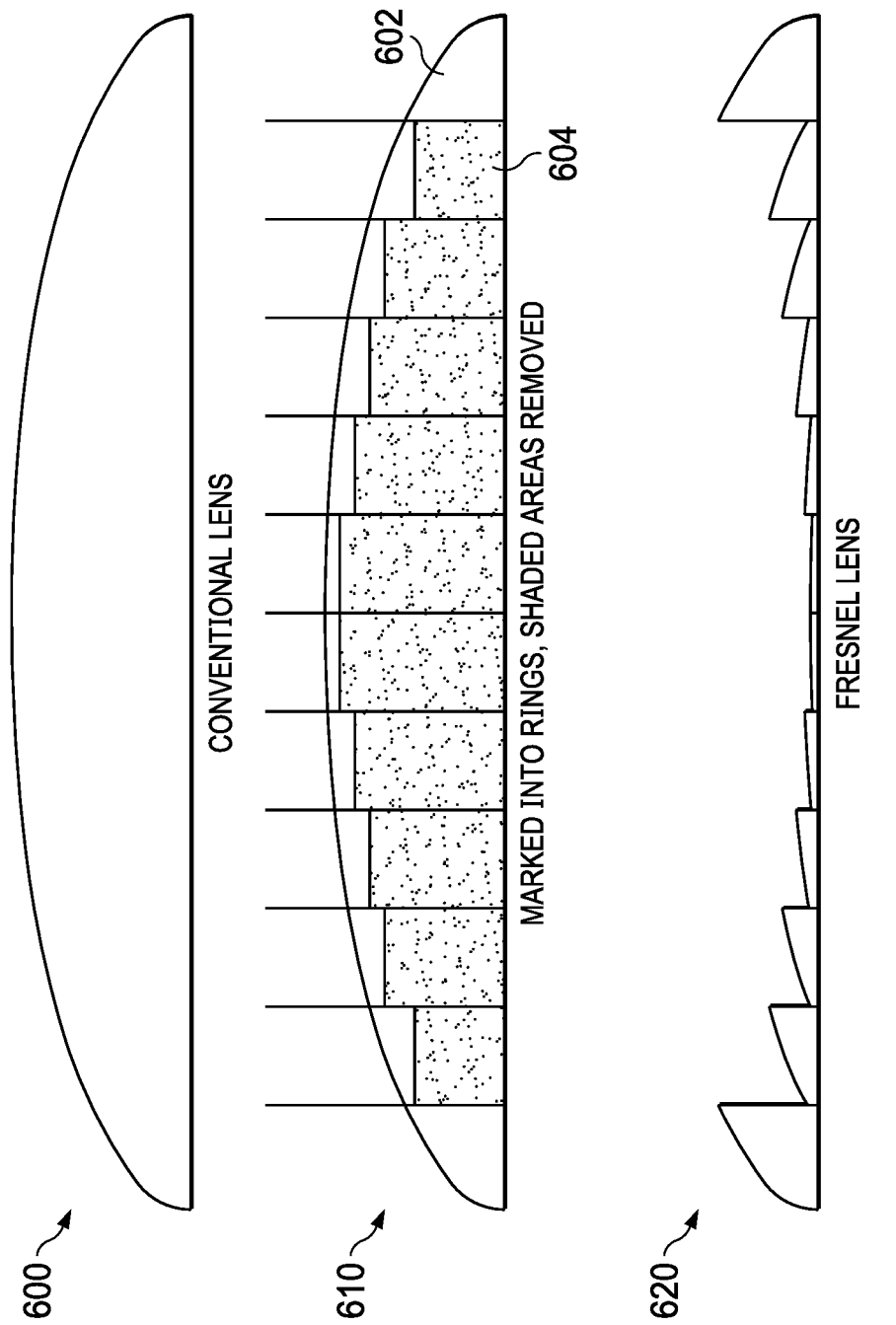
FIG. 6A is a diagram of a Fresnel lens according to one or more aspects of the present disclosure.
Figure 6B:
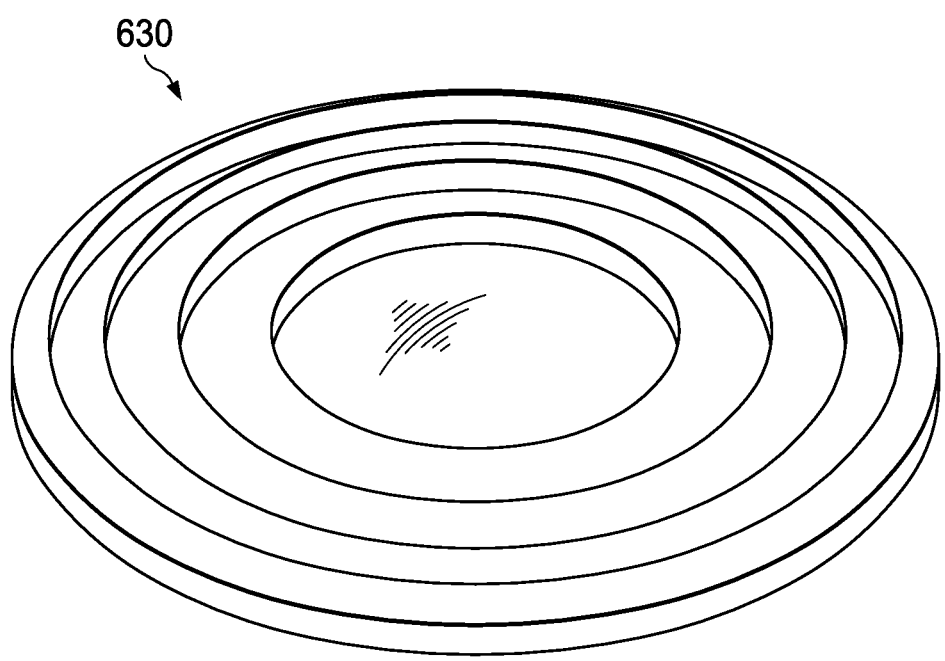
FIG. 6B is a perspective view of a Fresnel lens according to one or more aspects of the present disclosure.
Figure 6C:
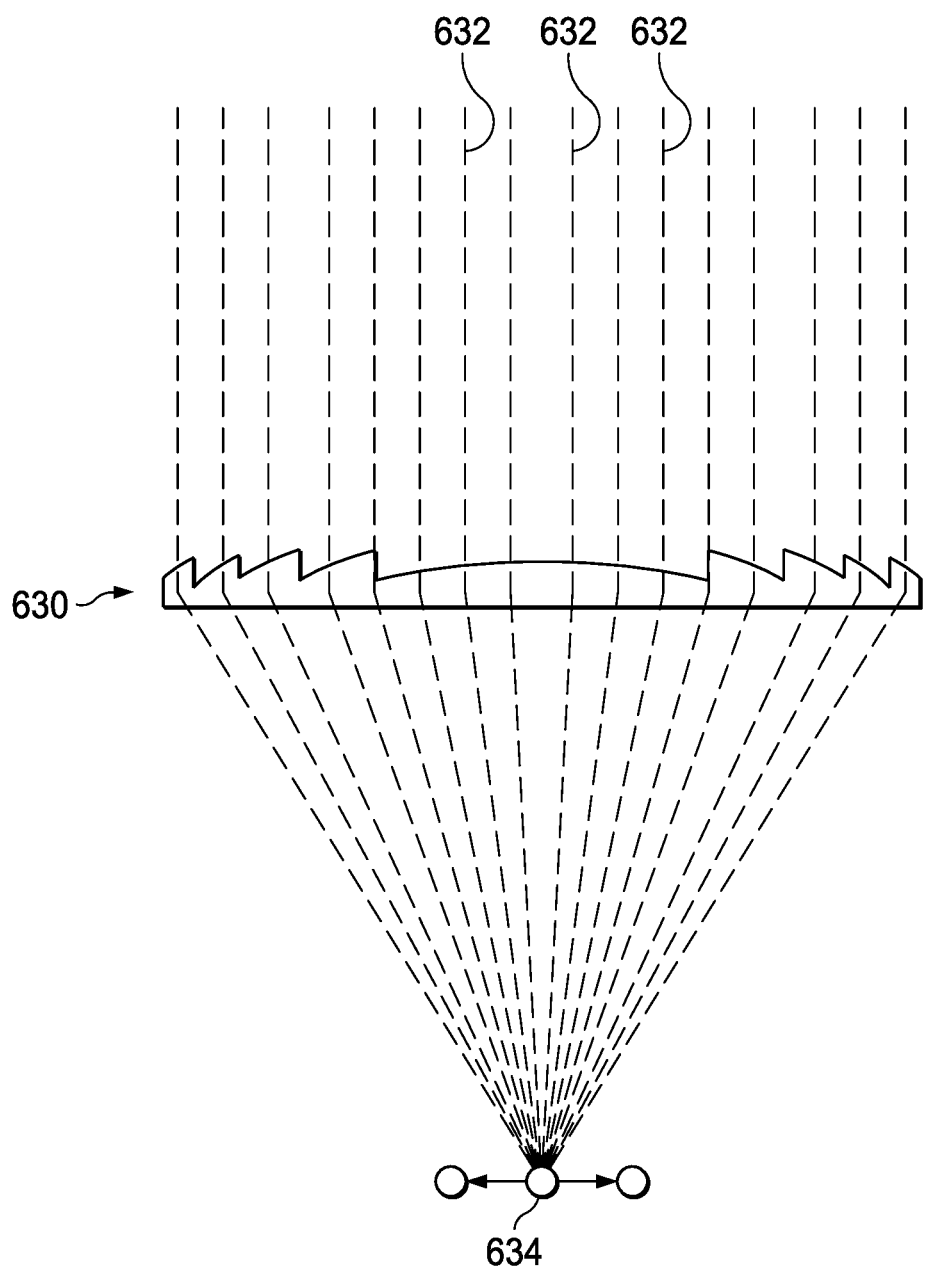
FIG. 6C is a diagram of light refraction through a Fresnel lens according to one or more aspects of the present disclosure.

FIGS. 6A-6C show various aspects of a Fresnel lens. A Fresnel lens is an optical element designed to minimize lens thickness while maximizing optical power. For example, a Fresnel lens is formed using the lens profile 602 of a thicker optical element 600 and removing discrete blocks 604 from the interior of the optical element 610. In some implementations, larger discrete blocks 604 are removed from the central portion of the optical element 610 as compared to the edges of the optical element. The resulting Fresnel lens 620 has a stepped profile as shown in FIG. 6B. As shown in FIG. 6C, the Fresnel lens 630 focuses light rays 632 to a focal point 634.

Figure 7A:
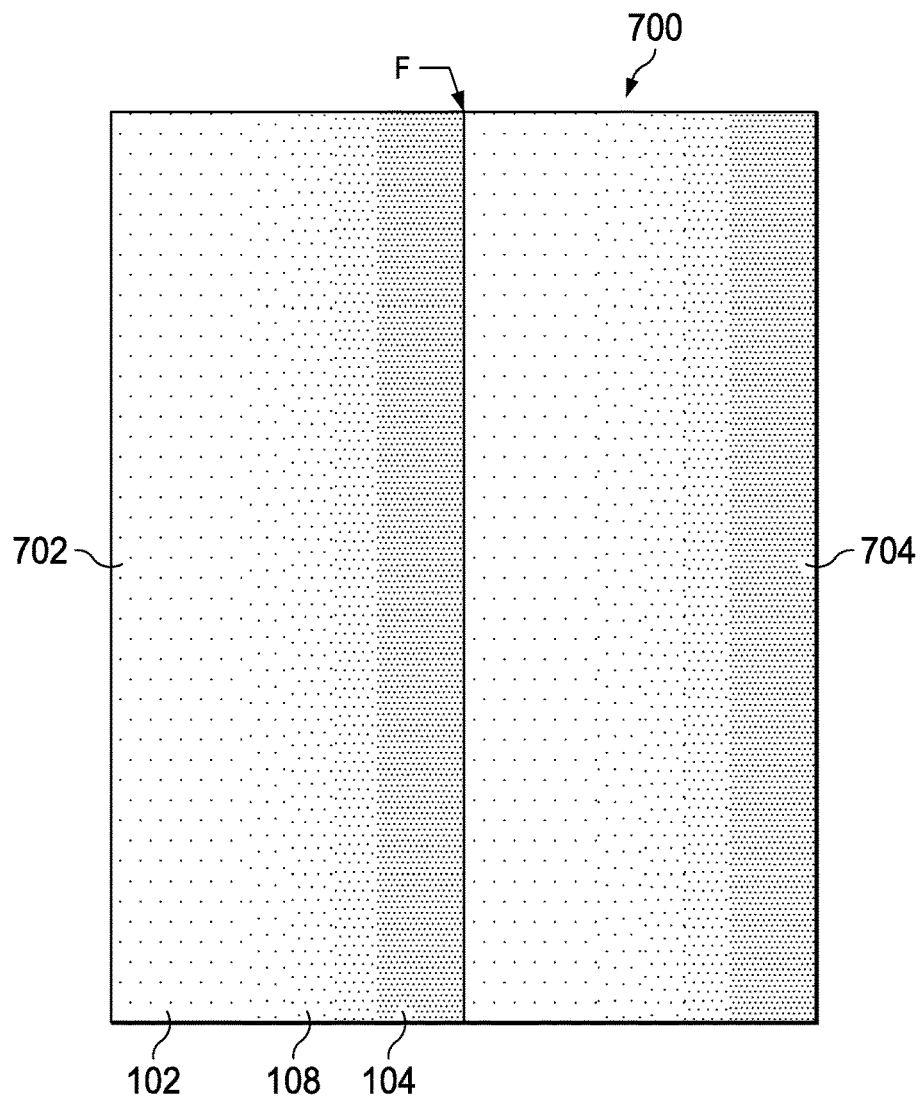
FIG. 7A is a side view of a portion of optical material including two transition portions according to one or more aspects of the present disclosure.
Figure 7B:
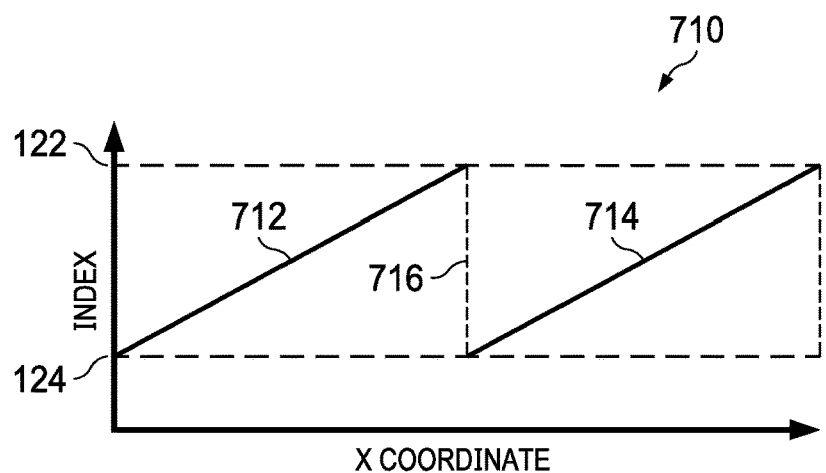
FIG. 7B is a diagram of an index of refraction of the portion of optical material in FIG. 7A according to one or more aspects of the present disclosure.

In some implementations, aspects of a Fresnel lens can be implemented in a GRIN lens to increase the optical power of the lens while minimizing light loss and lens thickness. For example, FIG. 7B shows a graph 710 of a GRIN lens 700 that has a first gradient portion 702 and a second gradient portion 704. In some implementations, the first gradient portion 702 is in direct contact with the second gradient portion 704. The first and second gradient portions 702, 704 may include a first optical material 102 and a second optical material 104. In some implementations, the first and second gradient portions 702, 704 include linear, radial, or spherical gradients. In the example of FIGS. 7A and 7B, the gradients are linear gradients. The index of refraction of the GRIN lens 700 gradually varies from a first value 124 to a second value 122 along the x-axis of the first and second gradient portions 702, 704 (along lines 712 and 714) and abruptly changes at point F (along line 716) between the first and second gradient portions 702, 704, as shown in FIG. 7B. The profile of the index of refraction of the GRIN lens 700 is also referred to as "wrapping around," as discussed in reference to FIG. 11 below. In some implementations, the second optical material 104 in the first gradient portion 702 directly contacts the first optical material 102 in the second gradient portion 704.

Figure 8:
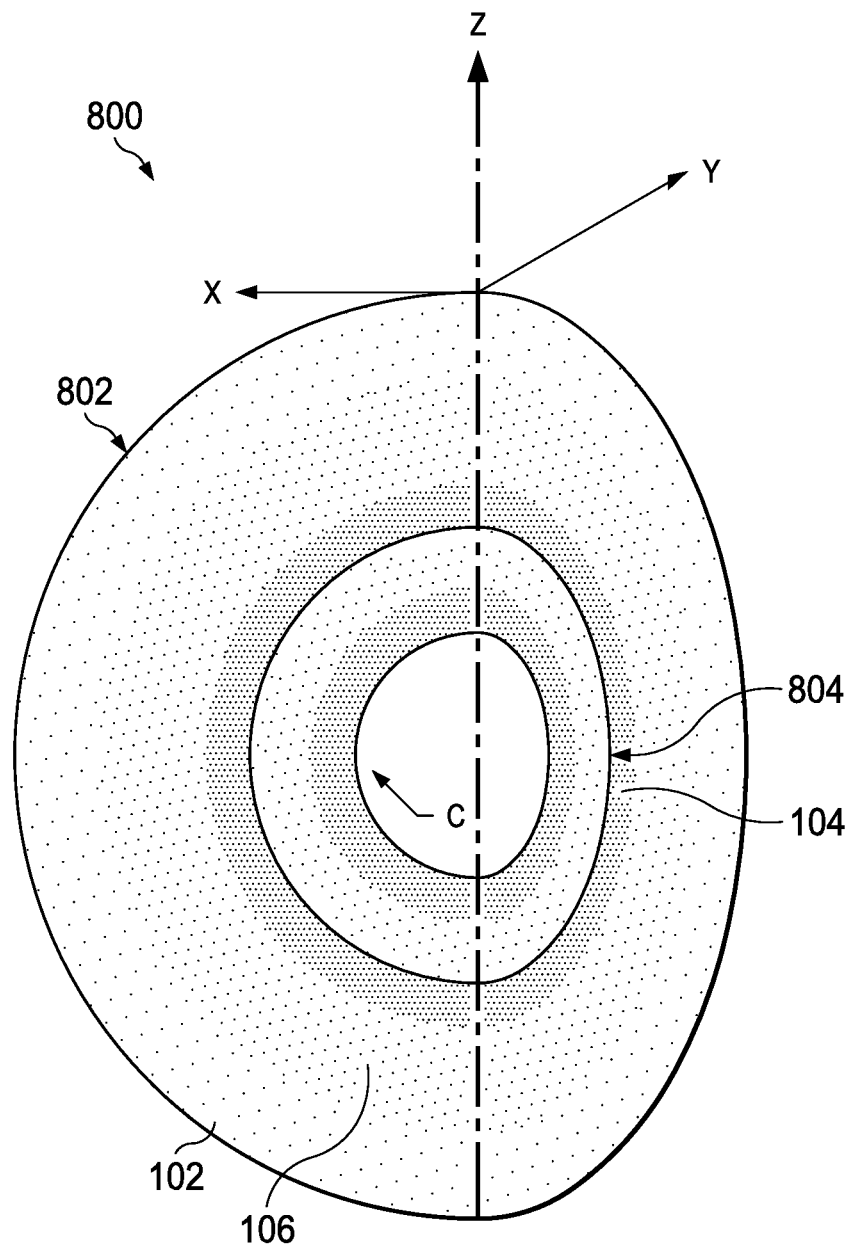
FIG. 8 is a perspective view of a spherical portion of optical material including two transition portions according to one or more aspects of the present disclosure.

The first and second gradient portions 702, 704 of FIG. 7A may be formed into a spherical shape, as shown in FIG. 8. The spherical portion 800 may include a first gradient portion 802 and second gradient portion 804. In some implementations, the first gradient portion 802 wraps around the second gradient portion 804, such that an inner radius of the first gradient portion 804 is placed against an outer radius of the second gradient portion 804.

Figure 9A:
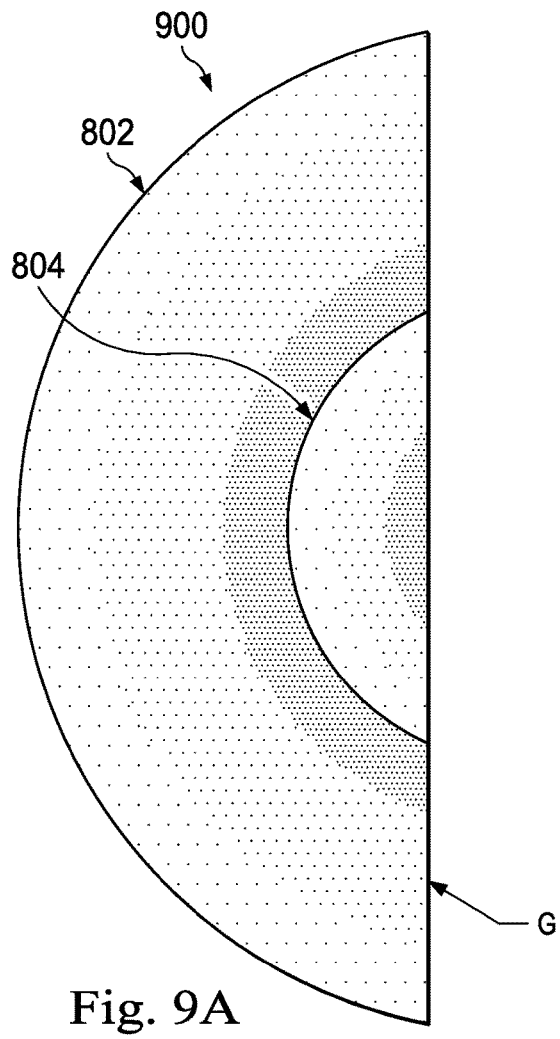
FIG. 9A is a perspective view of a portion of optical material including two transition portions according to one or more aspects of the present disclosure.
Figure 9C:
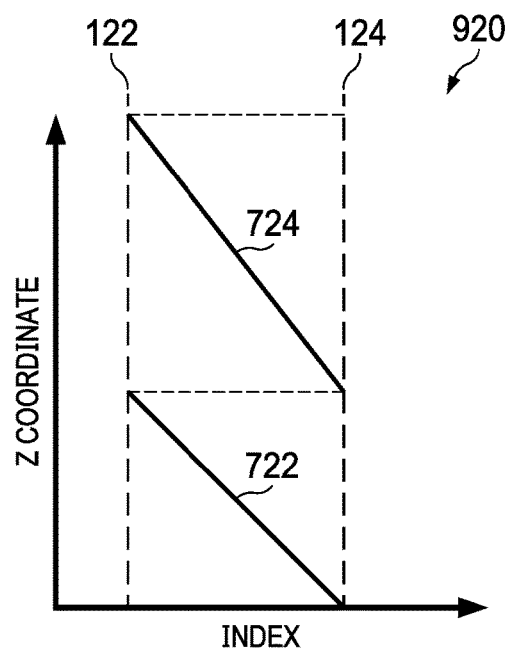
FIG. 9C is a diagram of an index of refraction of the portion of optical material along the z-axis in FIG. 9A according to one or more aspects of the present disclosure.
Figure 9B:
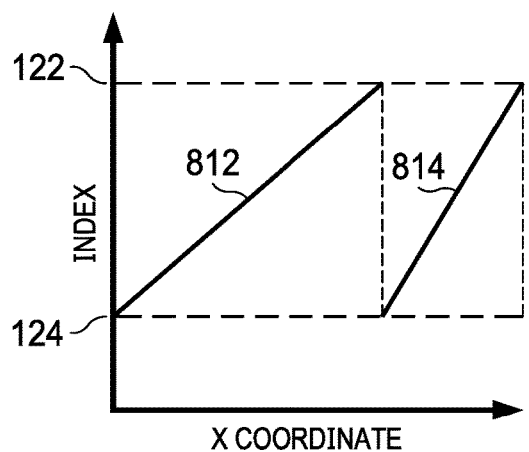
FIG. 9B is a diagram of an index of refraction of the portion of optical material along the x-axis in FIG. 9A according to one or more aspects of the present disclosure.

In some implementations, an edge of the spherical portion 800 may be polished flat on a surface G to form a GRIN optical device 900 as shown in FIG. 9A. The index of refraction along the x-axis of the GRIN optical device 900 is shown in the graph 910 of FIG. 9B and the index of refraction along the z-axis of the GRIN optical device 900 is shown in the graph 920 of FIG. 9C. In some implementations, the profile of the index of refraction of the GRIN optical device 900 varies from a first value 124 to a second value 122 along the x-axis has a first slope 812 (corresponding to the first gradient portion 802). The profile of the index of refraction of the GRIN optical device 900 may vary from a first value 124 to a second value 122 along the x-axis may have second slope 814 (corresponding to the second gradient portion 804). In some implementations, the first slope 812 is steeper than the second slope 814.

Figure 9D:
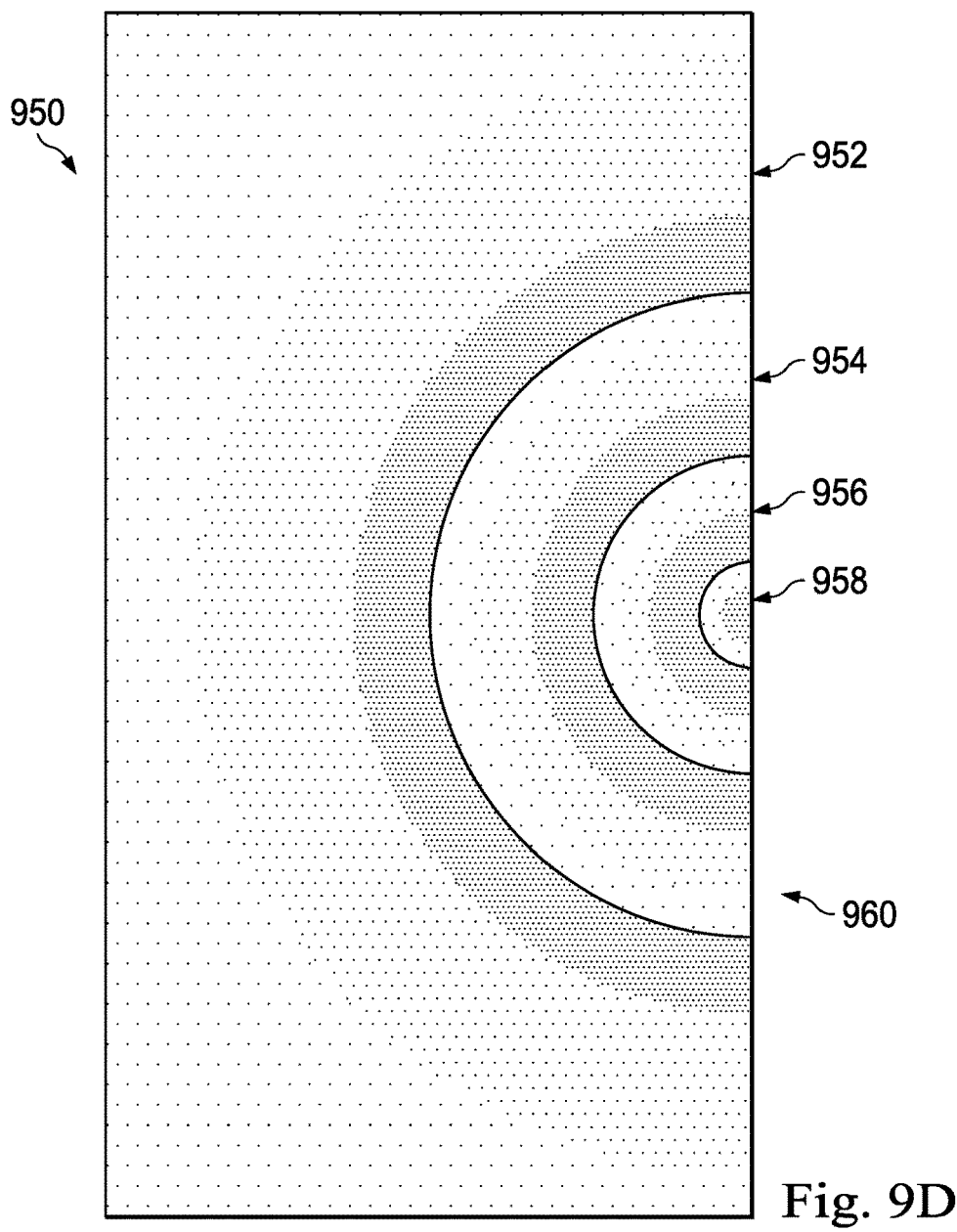
FIG. 9D is a side view of a portion of optical material including a plurality of transition portions according to one or more aspects of the present disclosure.
Figure 9E:
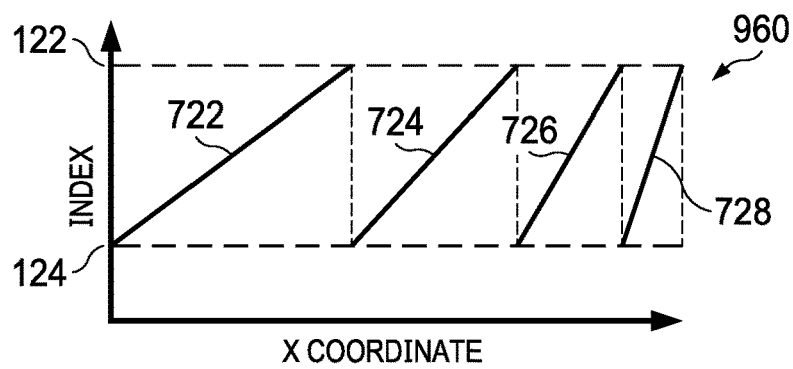
FIG. 9E is a diagram of an index of refraction of the portion of optical material along the x-axis in FIG. 9A according to one or more aspects of the present disclosure.
Figure 9F:
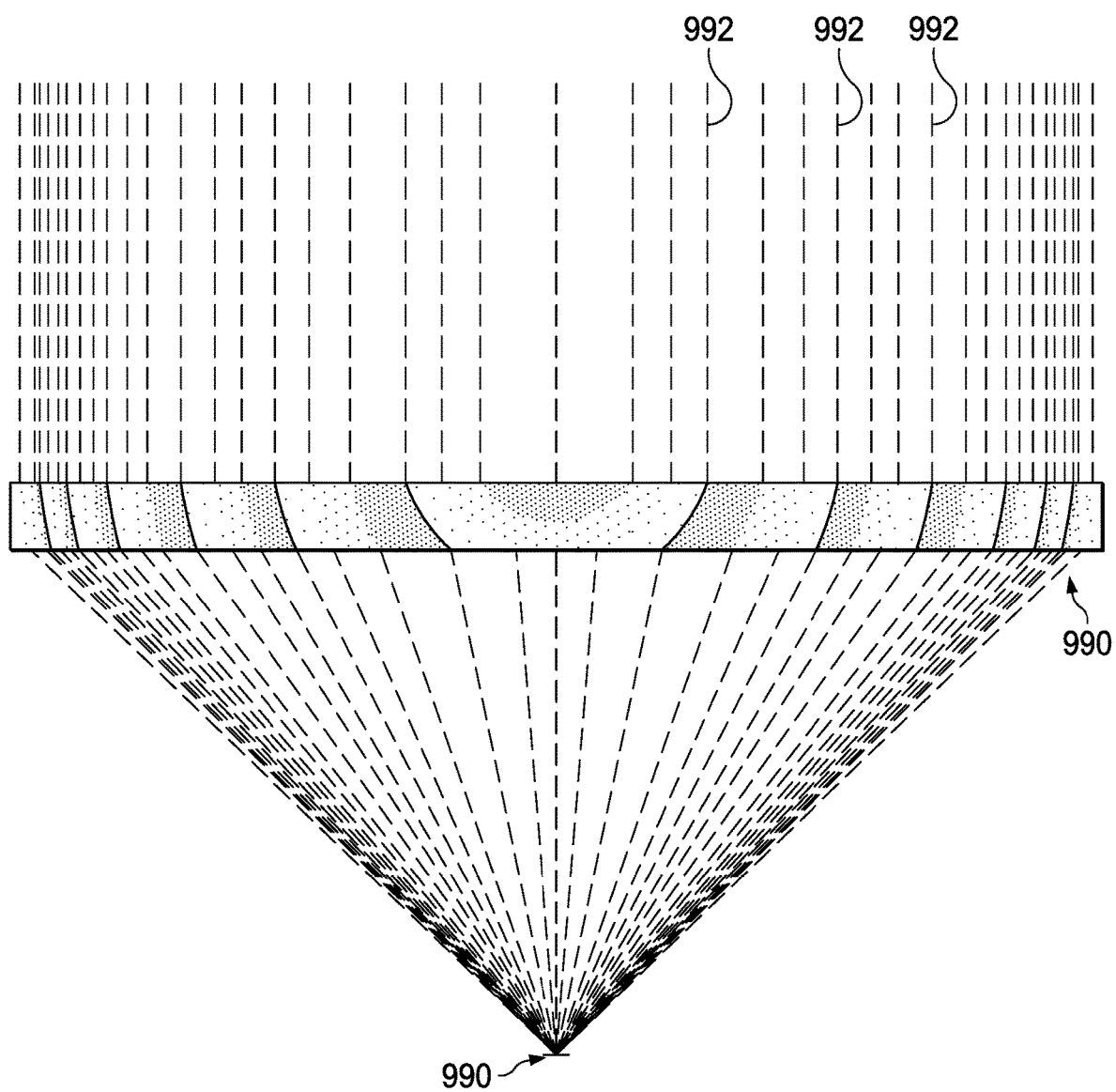
FIG. 9F is a perspective view of a modulo GRIN optical device according to or one more aspects of the present disclosure.

As discussed above, implementations of the Modulo GRIN design concept may include transitions between optical materials, such as layers, continuously variable (diffused) material systems, and 3D-printed geometries, as well as other types of transitions. For instances in which GRIN optical devices derive from a series of layers, modulo GRIN optical devices may have any number of layers. For example, FIG. 9D shows a modulo GRIN optical device 950 with a plurality of gradient layers 952, 954, 956, 958. In some implementations, these layers are arranged as concentric spherical shells. The gradient layers 952, 954, 956, 958 may each include a first material 102 and a second material 104 as discussed above. The index of refraction of each layer 952, 954, 956, 958 may gradually increase over the x-axis of the module GRIN optical device 950 with abrupt changes between each layer 952, 954, 956, 958, as shown in FIG. 9E. In some implementations, the profile of the index of refraction in each of the gradient layers 952, 954, 956, 958 increases toward the edge 960 of the modulo GRIN optical device, as shown in FIG. 9E. For example, the slope 728 of the profile of the index of refraction in gradient layer 958 may be greater than the slope 726 of the profile of the index of refraction in gradient layer 956, which may in turn be greater than the slope 722 of the profile of the index of refraction in gradient layer 952. In some implementations, the modulo GRIN optical device may have various numbers of gradient layers, such as two, three, five, six, ten, or twenty, as we as other numbers. The gradient layers may be arranged such that the index of refraction changes at a greater rate toward the edges of the modulo GRIN optical device as compared the center of the modulo GRIN optical device, similar to the Fresnel lens shown in FIGS. 6A-6C. This may allow the modulo GRIN optical device to focus light more strongly as compared to a GRIN lens with a single gradient layer.

FIG. 9E is an example of a modulo GRIN optical device 990 including a number of layers. In some implementations, the modulo GRIN optical device 990 is formed by removing optical material from a radial or spherical lens such that the GRIN optical device 990 includes linear front and back surfaces. The modulo GRIN optical device 990 may include GRIN materials arranged with a wrapped index of refraction, as discussed in FIG. 11. As shown in FIG. 9F, the modulo GRIN optical device 990 strongly focuses light rays 992 to a focal point. In some implementations, the modulo GRIN optical device is capable of focusing light more strongly than a conventional GRIN lens with the same width and optical materials.

Figure 10:
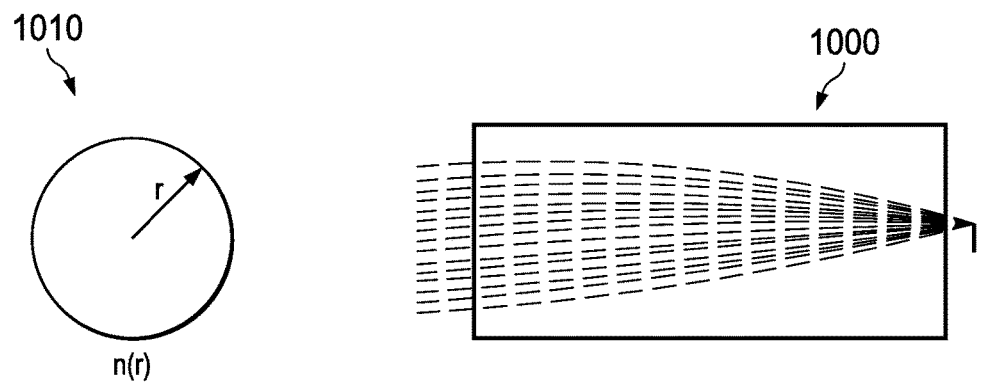
FIG. 10 is a diagram of a ray trace of an optical device according to one or more aspects of the present disclosure.
Figure 10:
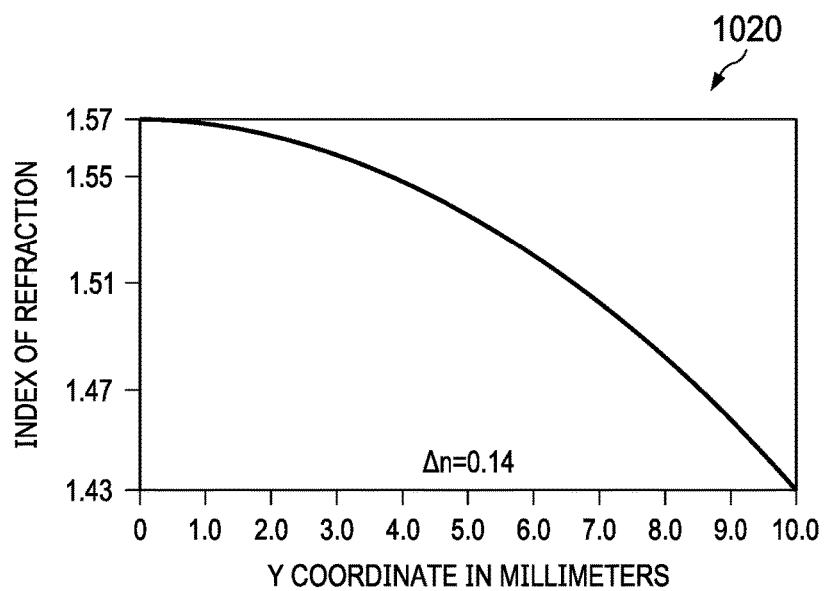
Figure 10:
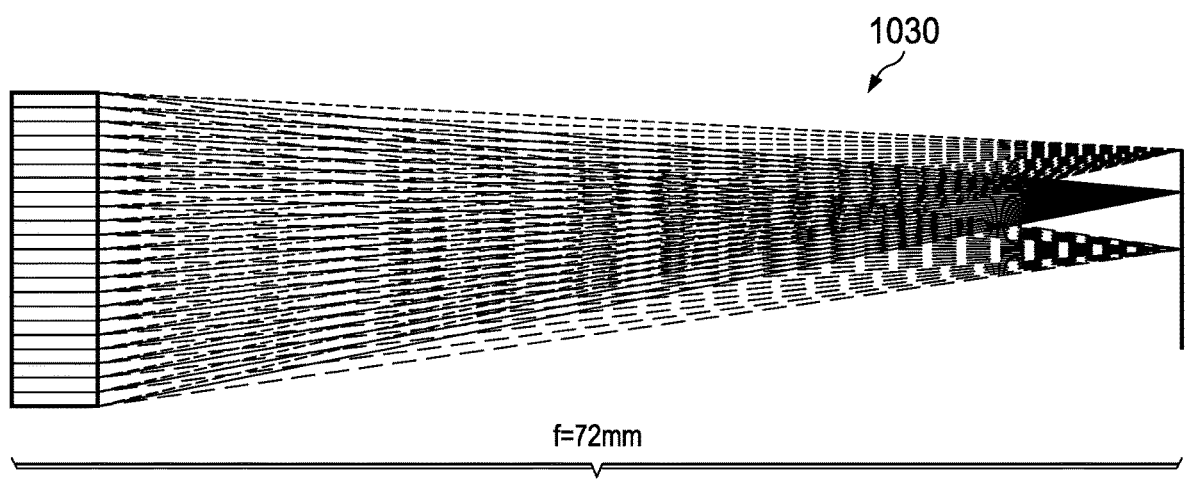
Figure 11:
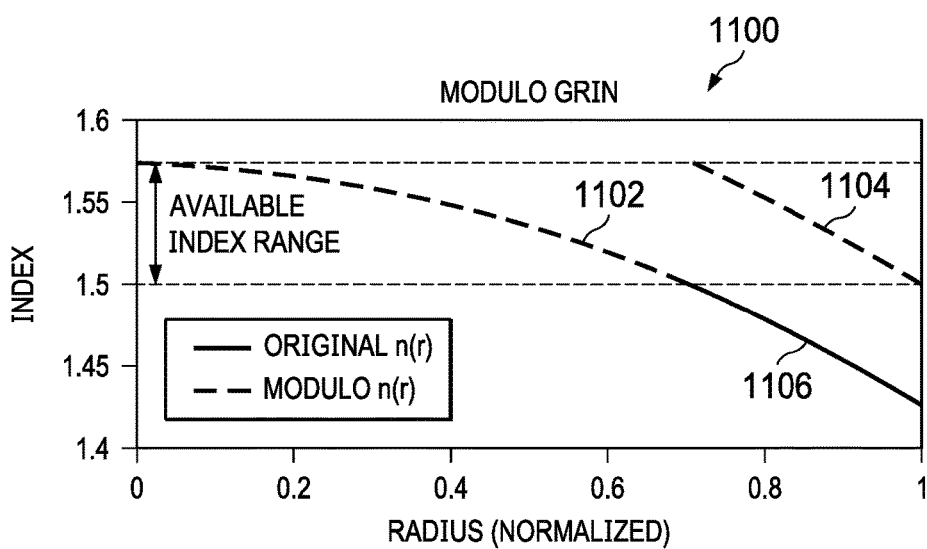
FIG. 11 is a diagram of a ray trace of a modulo GRIN optical device according to one or more aspects of the present disclosure.
Figure 11:
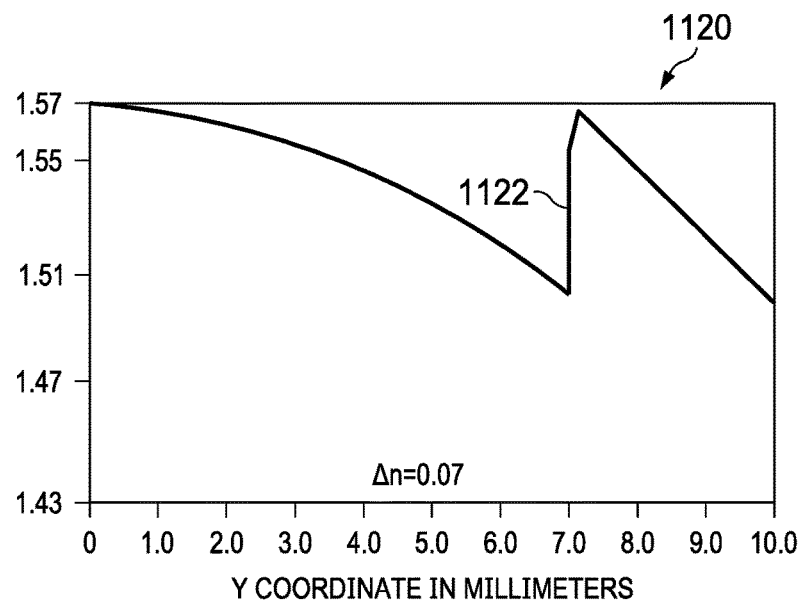
Figure 11:
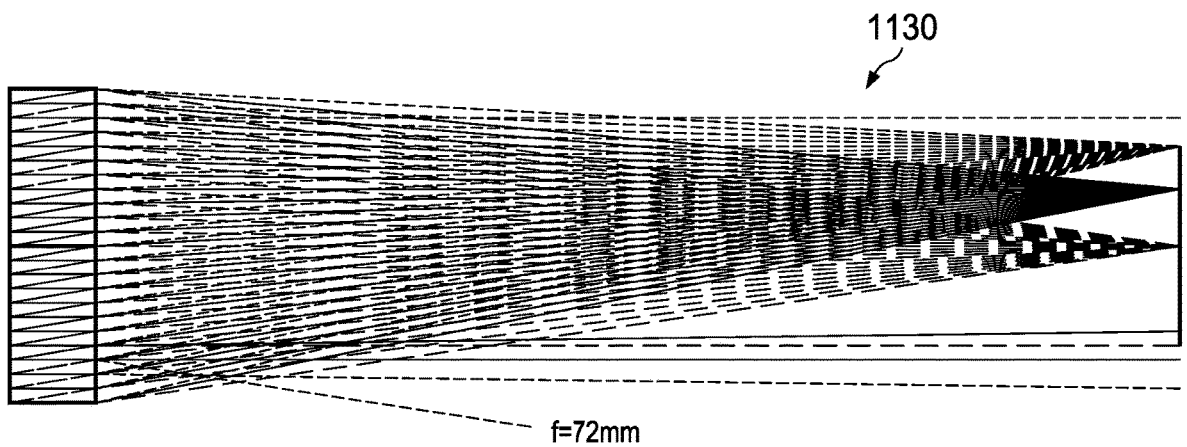

FIGS. 10 and 11 show comparisons of a GRIN lens with a single gradient layer to a modulo GRIN lens with multiple gradient layers. FIG. 10 shows optical information of a GRIN lens (also known as a Wood lens) with a radial gradient pattern as shown in diagrams 1000 and 1010. The GRIN lens has a focal length of 72 mm (as shown in spectrum 1030). The GRIN lens has change in index of refraction of 0.14 (labeled Δn) along the x-coordinate of the lens, with a roughly parabolic curve, as shown in graph 1020.

FIG. 11 shows optical information of a modulo GRIN optical device with two gradient layers. The modulo GRIN optical device has two gradient layers that each have a change in index of refraction of 0.07, as shown in graph 1120. The index of refraction changes abruptly along line 1122 between the gradient layers, such that the index of refraction "wraps around." For example, graph 1100 shows the index of refraction along the radius of the modulo GRIN optical device. The change in index of refraction changes gradually along curve 1102, similar to the first portion of the GRIN optical device profile 1020 as shown in graph 1020 in FIG. 10. However, instead of continuing along curve 1106 as the GRIN optical device in the example of FIG. 10, the index of refraction in the modulo GRIN optical device "wraps around" to curve 1104. This technique allows for a modulo GRIN optical device with the same focal length (72 mm) as a single gradient GRIN lens while minimizing the thickness and change in index of refraction. For example, the change in index of refraction of the modulo GRIN optical device of FIG. 11 is roughly half that of the GRIN optical device of FIG. 10, with only a 5% reduction of loss in energy (as shown in spectrums 1030 and 1130).

Figure 12:
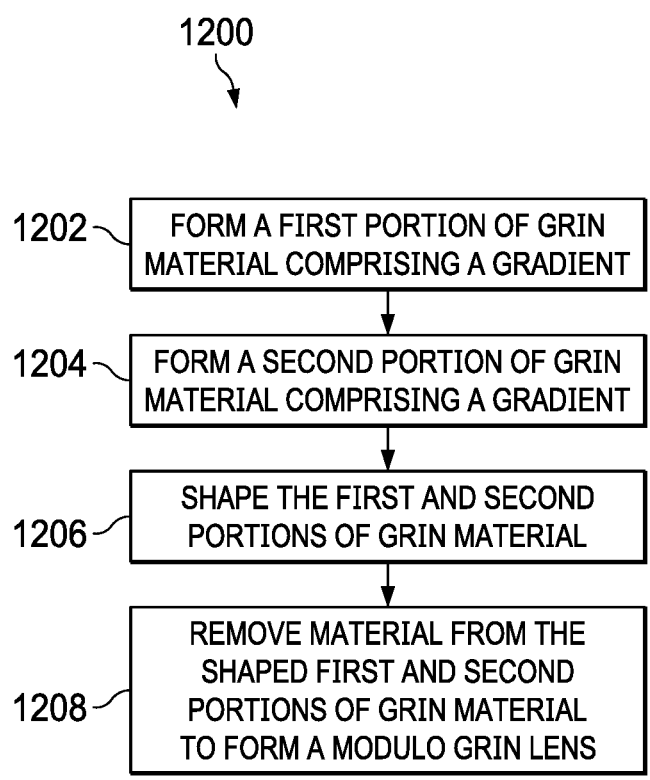
FIG. 12 is a flowchart of an exemplary method for creating a modulo GRIN optical device.

FIG. 12 illustrates an exemplary method for forming a modulo GRIN optical device as shown in FIGS. 7A-9E and 11. In some implementations, the modulo GRIN optical device, which may be a lens, may be used to provide maximum optical strength while minimizing the change in index of refraction, lens thickness, and energy loss through the lens.

The method 1200 may begin at step 1202 to form a first portion of GRIN material comprising a gradient. The first portion of GRIN material may comprise any type of optical material including glass, plastics, or other materials. In some implementations, the gradient may be linear, radial, or spherical.

The method 1200 may include step 1204 to form a second portion of GRIN material comprising a gradient. In some implementations, the first and second portions of GRIN material include the first and second materials 102, 104 discussed in FIGS. 1-9E. The first and second portions of GRIN material may have different thicknesses. Furthermore, the first and second portions of GRIN material may have different changes in index of refraction. For example, the first portion of GRIN material may have an index of refraction varying from a first value to a second value along a first curve and the second portion of GRIN material may have an index of refraction varying from the first value the second value along a second curve that is different than the first curve.

At step 1206, the method 1200 may include shaping the first and second portions of GRIN material. For example, the first and second portions of GRIN material may be joined together and formed into concentric spherical shells.

At step 1208, the method 1200 may include removing material from the shaped first and second portions of GRIN material to form a modulo GRIN optical device. In some implementations, areas of material may be removed to form one or more flat surfaces on the modulo GRIN optical device. For example, the modulo GRIN optical device may be formed as a rectangular prism with flat upper and lower surfaces. In other implementations, the modulo GRIN optical device may have one or more spherical or aspherical surfaces.

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A method of forming an optical device, comprising:
    forming a first portion having a first end and a second, opposite end, the first portion comprising a first gradient index (GRIN) material, wherein an index of refraction of the first portion varies from a first value at the first end to a second value at the second end of the first portion;
    forming a second portion adjacent the second end of the first portion, the second portion having a first end and a second, opposite end, the second portion comprising a second GRIN material, wherein an index of refraction of the second portion varies from the first value at the first end to the second value at the second end of the second portion, wherein the index of refraction of the first portion varies spherically from the first value at the first end to the second value at the second end of the first portion with respect to a center point, wherein the index of refraction of the second portion varies spherically from the first value at the first end to the second value at the second end of the second portion with respect to the center point; and
    removing at least a portion of the first portion or the second portion to form the optical device.

2. The method of claim 1, further comprising removing material from both the first portion and the second portion to form the optical device.

3. The method of claim 2, further comprising removing material from both the first portion and the second portion to form a flat, non-curved surface of the optical device.

4. The method of claim 1, wherein the index of refraction of the first portion gradually transitions from the first value at the first end to the second value at the second end of the first portion, wherein the index of refraction of the second portion gradually transitions from the first value at the first end to the second value at the second end of the second portion.

5. The method of claim 1, wherein the index of refraction of the first portion varies radially from the first value at the first end to the second value at the second end of the first portion with respect to a center point along the first end of the first portion, wherein the index of refraction of the second portion varies radially from the first value at the first end to the second value at the second end of the second portion with respect to a center point along the first end of the second portion.

6. The method of claim 1, further comprising:
    forming the first portion from at least a portion of a first spherical shell; and
    forming the second portion from at least a portion of a second spherical shell.

7. The method of claim 6, wherein the first spherical shell has a first radius on an inner surface and a second radius on an outer surface, wherein the second spherical shell has a third radius on an inner surface and a fourth radius on an outer surface.

8. The method of claim 7, wherein the first radius is smaller than the third radius.

9. The method of claim 1, wherein the first value of the index of refraction is lower than the second value of the index of refraction.

10. The method of claim 1, wherein the second value of the index of refraction is lower than the first value of the index of refraction.

11. An optical device, comprising:
    a first portion having a first end and a second, opposite end, the first portion comprising a first gradient index (GRIN) material, wherein an index of refraction of the first portion varies from a first value at the first end to a second value at the second end of the first portion; and
    a second portion having a first end and a second, opposite end, the second portion comprising a second GRIN material, wherein an index of refraction of the second portion varies from the first value at the first end to the second value at the second end of the second portion,
    wherein the index of refraction of the first portion varies spherically from the first value at the first end to the second value at the second end of the first portion with respect to a center point, wherein the index of refraction of the second portion varies spherically from the first value at the first end to the second value at the second end of the second portion with respect to the center point,
    wherein the second end of the first portion is disposed adjacent the first end of the second portion in a manner directing light through both the first and second portions.

12. The optical device of claim 11, wherein the index of refraction of the first portion gradually transitions from the first value at the first end to the second value at the second end of the first portion, wherein the index of refraction of the second portion gradually transitions from the first value at the first end to the second value at the second end of the second portion.

13. The optical device of claim 11, wherein the index of refraction of the first portion varies radially from the first value at the first end to the second value at the second end of the first portion with respect to a center point along the first end of the first portion, wherein the index of refraction of the second portion varies radially from the first value at the first end to the second value at the second end of the second portion with respect to a center point along the first end of the second portion.

14. The optical device of claim 11, wherein the first portion is formed from at least a portion of a first spherical shell, wherein the second portion is formed from at least a portion of a second spherical shell.

15. The optical device of claim 11, wherein the optical device has a flat, non-curved surface on at least one side.

16. The optical device of claim 15, wherein the first portion and the second portion are disposed along the flat, non-curved surface.

17. The optical device of claim 11, wherein the first value of the index of refraction is lower than the second value of the index of refraction.

18. The optical device of claim 11, wherein the second value of the index of refraction is lower than the first value of the index of refraction.

* * * * *